United States Patent [19]

Sumita

[11] 4,046,704
[45] Sept. 6, 1977

[54] HIGH POLYMER ELECTRET

[75] Inventor: Isao Sumita, Toyonaka, Japan

[73] Assignee: Matsushita Electric Industrial Co., Ltd., Osaka, Japan

[21] Appl. No.: 415,304

[22] Filed: Nov. 13, 1973

[30] Foreign Application Priority Data

Nov. 16, 1972   Japan .............................. 47-115376

[51] Int. Cl.$^2$ ............................................. H01B 3/00
[52] U.S. Cl. .................................. 252/63.2; 252/64; 307/88 ET; 260/208; 260/66
[58] Field of Search ........................ 252/63.2, 63.7, 66; 307/88 ET; 260/20 X, 897 R, 873, 900

[56] References Cited

U.S. PATENT DOCUMENTS 2,722,493   11/1955   Markwood, Jr. et al. .......... 117/232

OTHER PUBLICATIONS

Review of Modern Physics, vol. 20 No. 3, p. 458.

Primary Examiner—John D. Welsh
Attorney, Agent, or Firm—Stevens, Davis, Miller & Mosher

[57] ABSTRACT

There is provided a high polymer electret mainly composed of at least one member of a group consisting of poly-3,3-bis(chloromethyl)oxacyclobutane, poly-3,3-bis-(fluoromethyl)oxacyclobutane and poly-3,3-bis(-bromoethyl)oxacyclobutane.

2 Claims, 1 Drawing Figure

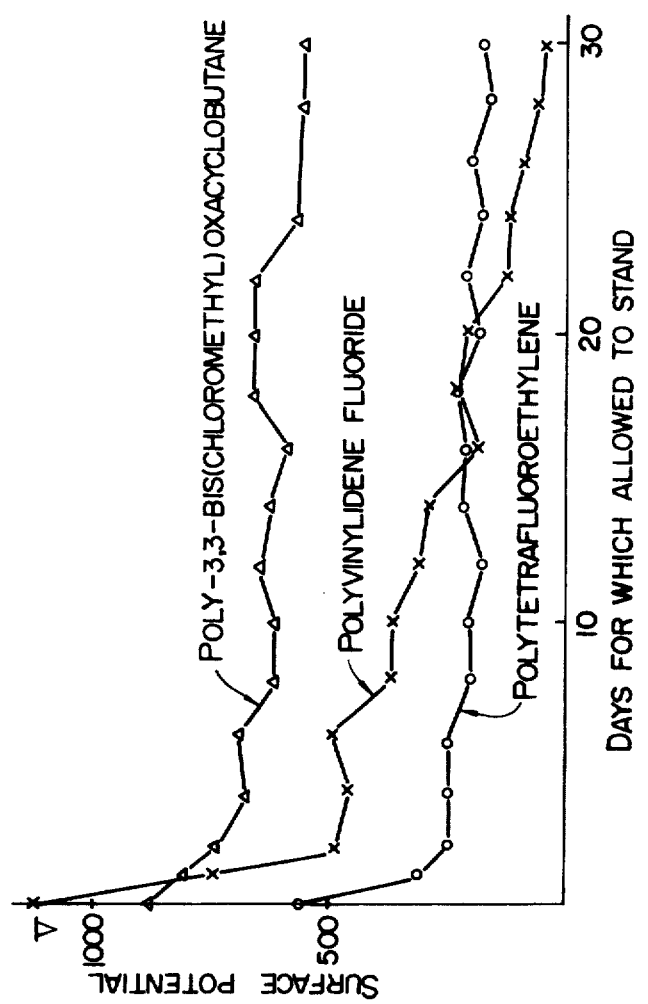

HIGH POLYMER ELECTRET

This invention relates to high polymer electrets and, more particularly, to high polymer electrets having high stability.

A high polymer can usually be polarized by applying a d-c electric field of high intensity to it under a certain temperature condition and then gradually cooling it. The resultant system is commonly termed a thermal electret. Also, in another well-known type of electret the polarization is caused by bombarding the high polymer material with charged particles.

These electrets are evaluated by their surface potential and attenuation characteristics. It is desired for the electret to have high surface potential and a low tendency to attenuate. Polyvinylidene fluoride, for example, permits attainment of a high surface potential, but the potential is readily attenuated. In contrast to polyvinylidene fluoride, polytetrafluoroethylene has a small factor of attenuation of polarization, but its surface potential can be increased only with difficulty. Heretofore, there has been obtained no electret, which is satisfactory both in surface potential attainability and stability of polarization.

According to the invention, there is provided and electret, which is superior in both of these characteristics. The high polymer electret according to the invention is obtained from a high polymer composition composed, as main component, of at least one member selected from the group of consisting of poly-3,3-bis(chloromethyl)oxacyclobutane, poly-3,3-bis(fluoromethyl)oxacyclobutane and poly-3,3-bis((bromomethyl)oxacyclobutane.

By the term "main component" here is meant a material to which the character of the electret can be imparted. Thus, an electret composed of a mixture of the afore-mentioned main component or components and one or more other types of high polymers of high insulation resistance such as polyethylene, polypropylene, polyvinylidene fluoride and polyethyleneterephthalate also falls within the scope of the invention.

The high polymer electret according to the invention can have high surface potential and is nevertheless very stable without undergoing substantial attenuation of polarization, so that it is greatly beneficial in industry.

The accompanying drawing shows the surface potential characteristic of an example of the high polymer electret according to the invention.

An example of the invention, using poly-3,3-bis(chloromethyl)oxacyclobutane, is given below, but similar characteristics were also obtained by using poly-3,3-bis(fluoromethyl)oxacyclobutane and poly-3,3-bis(bromomethyl)oxacyclobutane, respectively. Further, similar characteristics were obtained with blends of one or more of these "main component" materials and one or more other high polymers such as polyethylene, polypropylene, polyvinylidene fluoride and polyethyleneterephthalate.

The electret may be produced by any well-known method.

EXAMPLE 1

An electric field of 2000 volts was applied to poly-3,3-bis(chloromethyl)oxacyclobutane in the form of a film 200 microns thick and initially at a temperature of 160° C which was gradually reduced by cooling to room temperature.

The drawing shows the surface potential of the electret obtained in this way, the surface potential being plotted against days for which the electret was allowed to stand at room temperature. It will be seen that in this example the initial surface potential is quite comparable with that obtained with polyvinylidene fluoride in the same way, while the attenuation characteristic is as stable as that of polytetrafluoroethylene. Such high surface potential and high stability could not be simultaneously obtained with a prior art electret composed of a high polymer alone. With poly-3,3-bis(chloromethyl)oxacyclobutane alone the initial surface potential obtained in the above way was as high as 600 volts and scarcely attenuated even after the lapse of 30 days. Also, the attenuation characteristic at a temperature of 80° C and relative moisture of 60% was substantially as stable as that at room temperature.

EXAMPLE 2

Example 1 was repeated except that a film comprising a mixture of poly-3,3-bis(chloromethyl)oxacyclobutane and poly-3,3-bis(fluoromethyl)oxacyclobutane was substituted for the film of poly-3,3-bis(chloromethyl)oxacyclobutane to obtain similar results to those obtained in Example 1.

EXAMPLE 3

Example 1 was repeated except that a film comprising a mixture of poly-3,3-bis(chloromethyl)oxacyclobutane and polyethylene was used to obtain similar results to those obtained in Example 1.

What is claimed is:

1. A high polymer electret composed, as main component, of at least one member selected from the group consisting of poly-3,3-bis-(chloromethyl)oxacyclobutane, poly-3,3-bis(fluoromethyl)oxacyclobutane and poly-3,3-bis-(bromomethyl)oxacyclobutane, which has been treated by applying thereto a d-c electric field of high intensity at a temperature above room temperature which is gradually reduced to room temperature.

2. A high polymer electret according to claim 1, wherein it contains additionally one member selected from polyethylene, polypropylene, polyvinylidene fluoride and polyethyleneterephthalate.

* * * * *